Aug. 3, 1954 A. PANAGROSSI 2,685,459
COUPLING FOR FLEXIBLE METAL HOSE
Filed July 12, 1952 2 Sheets-Sheet 1
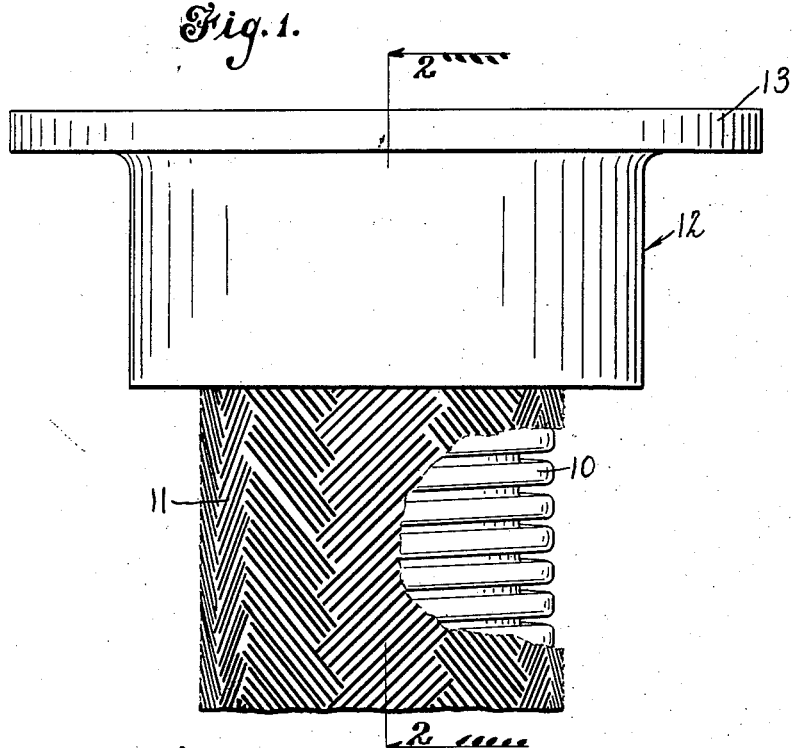
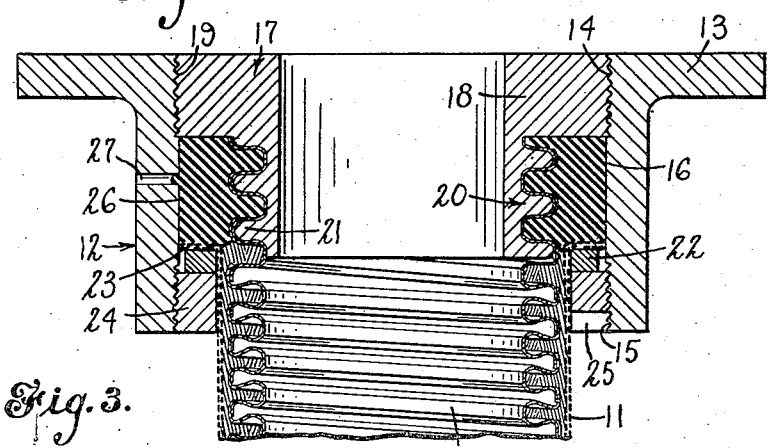
INVENTOR
Ahmed Panagrossi
BY
Rockwell & Bartholow
ATTORNEYS Aug. 3, 1954     A. PANAGROSSI     2,685,459
COUPLING FOR FLEXIBLE METAL HOSE Filed July 12, 1952     2 Sheets-Sheet 2

INVENTOR
Ahmed Panagrossi
BY
Rockwell & Bartholow
ATTORNEYS

Patented Aug. 3, 1954

2,685,459

UNITED STATES PATENT OFFICE 2,685,459

COUPLING FOR FLEXIBLE METAL HOSE

Ahmed Panagrossi, North Haven, Conn., assignor to The Connecticut Hard Rubber Company, New Haven, Conn., a corporation of Connecticut Application July 12, 1952, Serial No. 298,570

6 Claims. (Cl. 285—84)

This invention relates to couplings and relates more particularly to couplings for connection to flexible metal hose of the corrugated type and providing a vibration damper for the hose, the vibration damper acting as a leak-proof seal.

Flexible metal hose corrugated circumferentially in helical form is widely used in applications where service conditions are such that hose must withstand vibration. However, use of flexible metal hose has often proved unsatisfactory heretofore owing to difficulty in providing an effective vibration damper for the same. For example, in jet propelled aircraft vibration imparted to hose causing end shearing stresses is so considerable that heretofore flexible metal hose carrying fuel from fuel tanks to jet burners has had a service life of extremely short duration. Flexible metal hose has been found to fail particularly at the location of the coupling for the same and it often occurs that flexible metal hose fails at the coupling for the same where the coupling is rigidly mounted as at a fuel tank for example.

Another difficulty heretofore encountered in the use of flexible metal hose has been in connection with the provision of a suitable coupling and end support for metal sheathing, usually wire braid often encasing flexible metal hose.

Still another difficulty heretofore encountered in the use of flexible metal hose has been in connection with the provision of a coupling for the same providing an effective leak-proof seal for hose having a corrugated wall structure and often having a ragged or uneven end.

Accordingly, one object of the present invention is to obviate the aforementioned difficulties incident to the use of flexible metal hose.

Another object of the invention is to provide an improved coupling for flexible metal hose.

Still another object of the invention is to provide an improved coupling as above having a vibration damper for flexible metal hose.

Another object of the invention is to provide a coupling as above forming a leak-proof connection with flexible metal hose of the corrugated type.

In the accompanying drawings:

Fig. 1 is an elevational view of my improved coupling shown in association with flexible metal hose covered with wire braid, the latter being partly broken away to show the hose;

Fig. 2 is a sectional view on line 2—2 of Fig. 1;

Fig. 3 is a detail of the coupling shown in Figs. 1 and 2;

Figure 4:
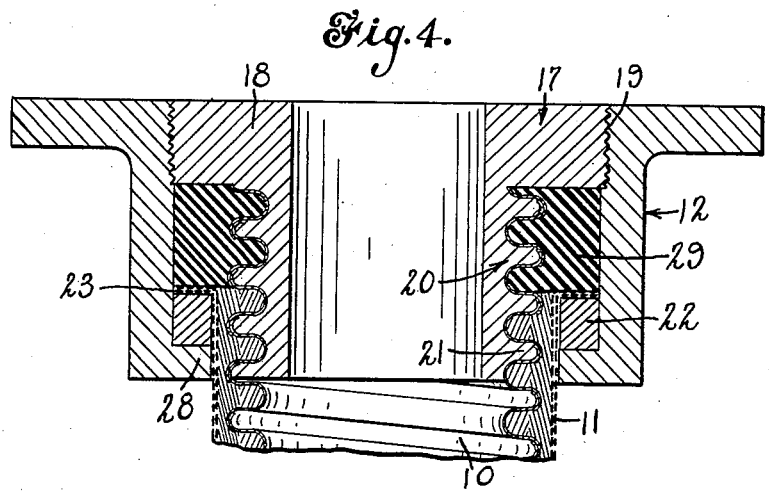
Fig. 4 is an elevational and sectional view of a coupling comprising a modified form of my invention.

In the drawings the invention is illustrated as embodied in connection with flexible metal hose 10 corrugated circumferentially in helical form and encased in armour or metal sheathing 11 preferably formed of wire braid. The hose 10 may be formed conveniently by a helically wound metal strip, the edges of which are in interconnected engagement.

In the embodiment of the invention illustrated in Figs. 1, 2 and 3 of the drawings, a sleeve member formed conveniently of cast metal and indicated generally at 12 is provided, the sleeve member 12 having a peripheral and preferably annular attaching flange 13 at the upper portion thereof for connection to a fuel tank, for example as by welding. As shown in Fig. 2 of the drawings the sleeve member 12 is screw threaded internally at its upper portion as at 14, and is screw threaded internally at its lower portion as at 15, and has a smooth wall portion 16 intermediate the threaded portions 14 and 15. As shown for example in Fig. 3 of the drawings, a tubular member indicated generally at 17 may be provided in the sleeve member 12, the tubular member 17 having a peripheral and annular flange 18 at the upper portion thereof screw threaded as at 19 for engagement with the upper threaded portion 14 of the sleeve member 12. A portion 20 of the tubular member 17 extending from the flange 18 to the lower end of the member 17 may be convoluted exteriorly thereof, as indicated at 21 in Fig. 3 of the drawings. As shown in Fig. 2 of the drawings, the convoluted portion 20 of the member 17 extends downwardly in the sleeve member 12 and is spaced inwardly from the latter. In the form of the invention illustrated in Figs. 1, 2 and 3 of the drawings, one end of the helically corrugated hose 10 may be screwed on the convoluted portion 20 of the member 17 so as to be disposed in embracing relation with respect to the convoluted portion 20 and closely adjacent thereto. As shown in Fig. 2, the aforementioned hose end may abut the underside of the flange 18 of the member 17.

A pressure ring 22 in embracing relationship with respect to the hose sheathing 11 may be inserted through the lower end of the sleeve member 12 and positioned adjacent the lower end of the convoluted portion 20 of the member 17, as shown in Figure 2 of the drawings; and the hose sheathing 11 may have an end portion 23 directed radially outwardly from the hose 10 and suitably secured to the upper surface of the pressure ring 22 as by welding. The pressure ring 22 may be engaged from below by an adjusting nut 24 screw threaded exteriorly thereof and cooperating with the lower threaded portion 15 of the sleeve member 12. The nut 24 may be recessed as at 25 to receive a spanner. The purpose of the pressure ring 22 and the adjusting nut 24 will appear hereinafter.

As shown in Fig. 2 of the drawings, an annular chamber 26 is located interiorly of the sleeve member 12 intermediate the ends of the latter, the chamber 26 being defined by a wall structure including the flange 18, the smooth wall portion 16, the portion 23 of the wire braid sheathing, and the hose end. A diametrically disposed port 27 may be formed in the sleeve member 12 in communication with the chamber 26. Elastomer or rubber in uncured condition may be introduced in the chamber 26 under pressure through the port 27 to fill the chamber 26. The rubber is then cured in the chamber 26. Curing the rubber in the chamber 26 causes the rubber to bond the hose end, the flange 18, and the smooth wall portion 16, and also causes the rubber, which may penetrate the portion 23 of the wire braid, to bond the portion 23, providing in effect an integral coupling structure. As shown in Fig. 2 of the drawings, the rubber fills the valleys and overlies the summits of the corrugated hose end portion and forms an effective damper for any vibration imparted to the hose portion connected to the coupling thereby appreciably lengthening the service life of the flexible metal hose in applications where considerable vibration is imparted to the hose. As noted above, the portion 23 of the wire braid may be secured to the upper surface of the pressure ring 22 as by welding, and the nut 24 engaging the under surface of the pressure ring 22, as shown in Fig. 2 of the drawings, may be adjusted to permit longitudinal adjustment of the ring 22 and to vary the pressure exerted on the rubber in the chamber 26, the arrangement being such that a very tight and leak-proof connection may be formed between the hose 10 and the coupling device; and it will be understood that the coupling structure provides a strong end support for the wire braid sheathing 11. From the foregoing, it will also be apparent that the connection between the hose 10 and the coupling device inhibits misalignment of the end portion of the hose, and in this connection, it may be noted that the nut 24, as shown in Fig. 2 of the drawings, fits closely over the hose 10 and the sheathing 11 at the lower part of the coupling device a distance below the hose end abutting the flange 18 of the tubular member 17. It may also be noted that the end of the hose 10 may be ragged or uneven without affecting the tightness of the connection between the hose 10 and the coupling device.

In accordance with the structure set forth the coupling comprising the combined vibration damper and leak-proof seal provides an excellent connection for flexible metal hose resisting torsional and endwise stresses imparted to the hose and inhibiting shearing of the hose. It will be apparent that the rubber-like material of which the combined vibration damper and leak-proof seal is formed will depend largely on the use for which the hose is intended. For example, silicone rubber may be used where resistance to extremes in temperature is required but other rubber resistant to gasoline is preferred in fuel lines.

Another coupling comprising a modified form of the invention is illustrated in Fig. 4 of the drawings. The sleeve member 12 is in this instance provided with an inwardly extending annular flange 28 at the lower end thereof and the pressure ring 22 is supported from below by the flange 28, the rubber vibration damper and leakproof seal being in this instance a rubber gasket 29 snugly embracing the corrugated end portion of the hose 10 as shown in Fig. 4, the arrangement being such that the tubular member 17 having the flange 18 engaging the gasket 29 may be screwed down on the gasket 29 to exert pressure on the latter.

Figure 5:
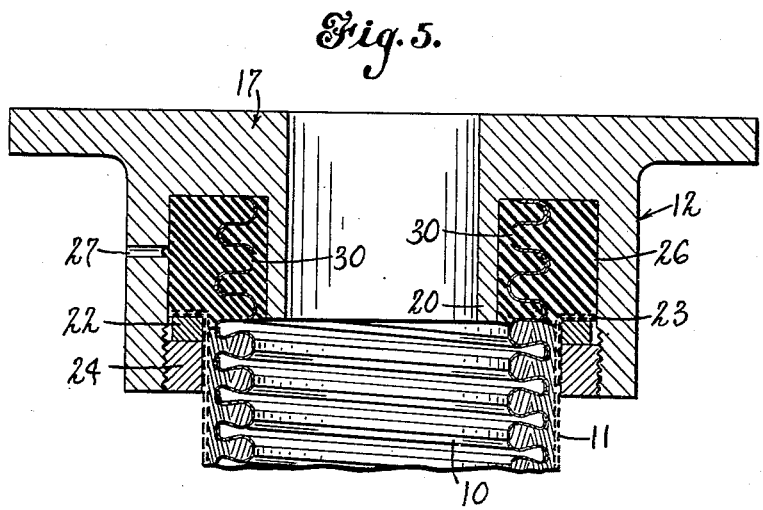
Fig. 5 is an elevational and cross-sectional view of another coupling comprising another modified form of my invention.

Another form of the invention is illustrated in Fig. 5 of the drawings. The last-mentioned form is generally similar to the form shown in Figs. 1, 2 and 3, but as shown in Fig. 5 the tubular part 17 is formed integral with the sleeve member 12 instead of being separable and the lower portion 20 of the part 17 may be of smooth cylindrical shape and spaced inwardly and concentrically of the end portion of the hose 10. Also as shown in Fig. 5, the end portion of the hose 10 embracing the lower portion 20 of the part 17 may be perforated as at 30. Uncured rubber may be forced through the port 27 of the sleeve member 12 and through the perforations 30 of the hose 10, filling the chamber 26, and then cured therein so as to grip the walls of the chamber and all portions of the hose end, the arrangement providing in effect an integral coupling structure comprising a vibration damper and a leak-proof seal for the hose 10.

While several different forms of the invention have been described and illustrated in the drawings by way of example, it will be understood that the invention can take various other forms without departing from the principles of the invention as pointed out by the appended claims.

What I claim is:

1. A coupling structure comprising a flexible metal hose circumferentially corrugated and encased in a metal sheathing throughout a portion of its length, said sheathing having a flanged end portion extending radially outwardly of the hose at the termination of the sheathing, a sleeve member having an outer wall structure and receiving an end portion of said hose and also receiving the flanged end portion of said sheathing, said member being provided with an inner tubular part disposed concentric to and radially spaced inward from the wall structure and having a portion extending into said hose portion, said wall structure and the tubular part having outer ends; end wall means connecting said ends; said wall structure, tubular part and end wall means forming a chamber in which the end portion of the hose and flanged end portion of the sheathing are received, a rubber element disposed in the chamber and extending between the end portion of the hose and said wall structure and embracing said end portion of the hose and extending into the valleys of said corrugated hose portion and extending between the end wall means and the flanged end portion of the sheathing, and pressure means located intermediate said wall structure and said hose portion and contacting the flanged end portion of the sheathing, said pressure means including a pressure ring in said sleeve member, said flanged end portion of the sheathing being entirely interposed between the adjacent faces of the pressure ring and the rubber element and said pressure ring providing an end support for the sheathing and exerting axial pressure on the rubber element tending to expand the material of said element into the valleys of said hose.

2. A coupling structure as claimed in claim 1, wherein said flanged end portion of the sheathing is welded to the said face of the pressure ring.

3. A coupling structure as claimed in claim 1, wherein said sleeve member is threaded interiorly at the opposing outer and inner end portions thereof, said end wall means including a radial outwardly projecting exteriorly threaded flange on the outer end of the tubular part which is threaded into the threaded outer end of the sleeve member; and an adjusting nut disposed over the sheathing and threaded into the inner threaded end portion of the sleeve member and bearing against the pressure ring, said tubular part having its portion which extends into the hose convoluted.

4. A coupling structure as claimed in claim 1, wherein said sleeve member has an interiorly threaded outer end and an inwardly extending flange on its inner end, said flange forming a backing member for the pressure ring, and said end wall means including a radial outwardly extending exteriorly threaded flange on the outer end of the tubular part, said flange on the tubular part being threaded into the outer end of the sleeve member, said tubular part having its portion which extends into the hose convoluted.

5. A coupling structure as claimed in claim 1, wherein said end wall means includes a radial wall integral with the tubular part and the sleeve member, said inner end of the sleeve member being interiorly threaded, and an adjusting nut disposed over said sheathing and having threaded engagement with said threaded end of the sleeve member and bearing against the pressure ring on the face opposite to that contacting the flanged end portion of the sheathing.

6. A coupling structure as claimed in claim 5, wherein said portion of the tubular part which extends into the hose is smooth, said end portion of the hose being spaced radially outward from the tubular part and radially inward from the wall structure and having a plurality of radial apertures formed therein, said apertures receiving said rubber element therethrough to bond the tubular part, said end portion of the hose and the wall structure together.

References Cited in the file of this patent

UNITED STATES PATENTS

| Number | Name | Date |
|---|---|---|
| 318,356 | Cogan | May 19, 1885 |
| 1,054,244 | Rudolph | Feb. 25, 1913 |
| 1,440,508 | Todd | Jan. 2, 1923 |
| 1,974,383 | Wallace | Sept. 13, 1934 |
| 2,273,398 | Couty et al. | Feb. 17, 1942 |